US008381310B2

(12) United States Patent
Gangotri et al.

(10) Patent No.: US 8,381,310 B2
(45) Date of Patent: Feb. 19, 2013

(54) SYSTEMS, METHODS, AND PROGRAM APPLICATIONS FOR SELECTIVELY RESTRICTING THE PLACESHIFTING OF COPY PROTECTED DIGITAL MEDIA CONTENT

(75) Inventors: Arun L. Gangotri, Bangalore (IN); Alexander Gurzhi, Cupertino, CA (US)

(73) Assignees: Sling Media PVT. Ltd., Bangalore (IN); Sling Media, Inc., Foster City, CA (US)

( * ) Notice: Subject to any disclaimer, the term of this patent is extended or adjusted under 35 U.S.C. 154(b) by 160 days.

(21) Appl. No.: 12/623,955

(22) Filed: Nov. 23, 2009

(65) Prior Publication Data
US 2010/0071076 A1 Mar. 18, 2010

(30) Foreign Application Priority Data
Aug. 13, 2009 (IN) .......................... 1922/CHE/2009

(51) Int. Cl.
*H04L 29/06* (2006.01)
*H04N 7/173* (2011.01)
(52) U.S. Cl. .......................................... 726/30; 726/32
(58) Field of Classification Search .................. 726/32, 726/30
See application file for complete search history.

(56) References Cited

U.S. PATENT DOCUMENTS

| 3,416,043 A | 12/1968 | Jorgensen |
| 4,254,303 A | 3/1981 | Takizawa |
| 5,161,021 A | 11/1992 | Tsai |
| 5,237,648 A | 8/1993 | Mills et al. |
| 5,386,493 A | 1/1995 | Degen et al. |
| 5,434,590 A | 7/1995 | Dinwiddie, Jr. et al. |
| 5,493,638 A | 2/1996 | Hooper et al. |
| 5,602,589 A | 2/1997 | Vishwanath et al. |
| 5,661,516 A | 8/1997 | Carles |
| 5,666,426 A | 9/1997 | Helms |
| 5,682,195 A | 10/1997 | Hendricks et al. |
| 5,706,290 A | 1/1998 | Shaw et al. |
| 5,708,961 A | 1/1998 | Hylton et al. |

(Continued)

FOREIGN PATENT DOCUMENTS

| CN | 1464685 | 12/2003 |
| DE | 4407319 A1 | 9/1994 |

(Continued)

OTHER PUBLICATIONS

European Patent Office, European Search Report for European Application No. EP 08 16 7880, mailed Mar. 4, 2009.

(Continued)

*Primary Examiner* — Kaveh Abrishamkar
*Assistant Examiner* — Theodore Parsons
(74) *Attorney, Agent, or Firm* — Ingrassia Fisher & Lorenz, P.C.

(57) ABSTRACT

Systems, methods, and program products are provided for selectively restricting the transmission of copy protected digital media content from a computer system, over a network, and to a remote display. In one embodiment, a method includes the steps of capturing digital media content rendered on the local display by a media player application executed by the computer system; determining whether the media player application is accessing copy protected digital media content; and, if the media player application is not accessing copy protected digital media content, converting the captured digital media content to a media stream and transmitting the media stream over a network for presentation on a remote display.

15 Claims, 6 Drawing Sheets

U.S. PATENT DOCUMENTS

| | | | |
|---|---|---|---|
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |
| 5,778,077 A | 7/1998 | Davidson |
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,434,113 B1 | 8/2002 | Gubbi |
| 6,442,067 B1 | 8/2002 | Chawla et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Masud et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,124,366 B2 | 10/2006 | Foreman et al. |
| 7,151,575 B1 | 12/2006 | Landry et al. |
| 7,155,609 B2 * | 12/2006 | Chan et al. ............ 713/171 |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | DaCosta |
| 7,424,747 B2 * | 9/2008 | DeTreville ............... 726/32 |
| 7,430,686 B1 | 9/2008 | Wang et al. |
| 7,464,396 B2 | 12/2008 | Hejna, Jr. |
| 7,502,733 B2 | 3/2009 | Andrsen et al. |
| 7,505,480 B1 | 3/2009 | Zhang et al. |
| 7,506,377 B2 * | 3/2009 | Hanks ..................... 726/26 |
| 7,565,681 B2 | 7/2009 | Ngo et al. |
| 7,874,003 B2 * | 1/2011 | Takashima ............... 726/26 |
| 7,912,952 B2 * | 3/2011 | Mizutani et al. ......... 709/225 |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0031333 A1 | 3/2002 | Mano et al. |
| 2002/0046404 A1 | 4/2002 | Mizutani |
| 2002/0053053 A1 | 5/2002 | Nagai et al. |
| 2002/0064096 A1 | 5/2002 | Ukita et al. |
| 2002/0080753 A1 | 6/2002 | Lee |
| 2002/0090029 A1 | 7/2002 | Kim |

| | | | |
|---|---|---|---|
| 2002/0099837 A1 | 7/2002 | Oe et al. | |
| 2002/0105529 A1 | 8/2002 | Bowser et al. | |
| 2002/0112247 A1 | 8/2002 | Horner et al. | |
| 2002/0122137 A1 | 9/2002 | Chen et al. | |
| 2002/0131497 A1 | 9/2002 | Jang | |
| 2002/0138843 A1 | 9/2002 | Samaan et al. | |
| 2002/0143973 A1 | 10/2002 | Price | |
| 2002/0147634 A1 | 10/2002 | Jacoby et al. | |
| 2002/0147687 A1 | 10/2002 | Breiter et al. | |
| 2002/0167458 A1 | 11/2002 | Baudisch et al. | |
| 2002/0188818 A1 | 12/2002 | Nimura et al. | |
| 2002/0191575 A1 | 12/2002 | Kalavade et al. | |
| 2002/0196939 A1 | 12/2002 | Unger et al. | |
| 2003/0001880 A1 | 1/2003 | Holtz et al. | |
| 2003/0009668 A1* | 1/2003 | Chan et al. | 713/171 |
| 2003/0028873 A1 | 2/2003 | Lemmons | |
| 2003/0065915 A1 | 4/2003 | Yu et al. | |
| 2003/0093260 A1 | 5/2003 | Dagtas et al. | |
| 2003/0095791 A1 | 5/2003 | Barton et al. | |
| 2003/0115167 A1 | 6/2003 | Sharif et al. | |
| 2003/0159143 A1 | 8/2003 | Chan | |
| 2003/0187657 A1 | 10/2003 | Erhart et al. | |
| 2003/0192054 A1 | 10/2003 | Birks et al. | |
| 2003/0208612 A1 | 11/2003 | Harris et al. | |
| 2003/0231621 A1 | 12/2003 | Gubbi et al. | |
| 2004/0003406 A1 | 1/2004 | Billmaier | |
| 2004/0052216 A1 | 3/2004 | Roh | |
| 2004/0068334 A1 | 4/2004 | Tsai et al. | |
| 2004/0083301 A1 | 4/2004 | Murase et al. | |
| 2004/0091109 A1 | 5/2004 | Son et al. | |
| 2004/0100486 A1 | 5/2004 | Flamini et al. | |
| 2004/0103340 A1 | 5/2004 | Sundareson et al. | |
| 2004/0139047 A1 | 7/2004 | Rechsteiner et al. | |
| 2004/0162845 A1 | 8/2004 | Kim et al. | |
| 2004/0162903 A1 | 8/2004 | Oh | |
| 2004/0172410 A1 | 9/2004 | Shimojima et al. | |
| 2004/0205830 A1 | 10/2004 | Kaneko | |
| 2004/0212640 A1 | 10/2004 | Mann et al. | |
| 2004/0213273 A1* | 10/2004 | Ma | 370/401 |
| 2004/0216173 A1 | 10/2004 | Horoszowski et al. | |
| 2004/0230806 A1* | 11/2004 | Lisanke | 713/182 |
| 2004/0236844 A1 | 11/2004 | Kocherlakota | |
| 2004/0255249 A1 | 12/2004 | Chang et al. | |
| 2005/0021398 A1 | 1/2005 | McCleskey et al. | |
| 2005/0027821 A1 | 2/2005 | Alexander et al. | |
| 2005/0038981 A1 | 2/2005 | Connor et al. | |
| 2005/0044058 A1 | 2/2005 | Matthews et al. | |
| 2005/0050462 A1 | 3/2005 | Whittle et al. | |
| 2005/0053356 A1 | 3/2005 | Mate et al. | |
| 2005/0055595 A1 | 3/2005 | Frazer et al. | |
| 2005/0060759 A1 | 3/2005 | Rowe et al. | |
| 2005/0094987 A1* | 5/2005 | Suzuki | 386/125 |
| 2005/0097542 A1 | 5/2005 | Lee | |
| 2005/0114852 A1 | 5/2005 | Chen et al. | |
| 2005/0132351 A1 | 6/2005 | Randall et al. | |
| 2005/0138560 A1 | 6/2005 | Lee et al. | |
| 2005/0198584 A1 | 9/2005 | Matthews et al. | |
| 2005/0201726 A1* | 9/2005 | Malcolm et al. | 386/94 |
| 2005/0204046 A1 | 9/2005 | Watanabe | |
| 2005/0216851 A1 | 9/2005 | Hull et al. | |
| 2005/0227621 A1 | 10/2005 | Katoh | |
| 2005/0229118 A1 | 10/2005 | Chiu et al. | |
| 2005/0246369 A1 | 11/2005 | Oreizy et al. | |
| 2005/0251833 A1 | 11/2005 | Schedivy | |
| 2005/0262496 A1* | 11/2005 | Seki et al. | 717/170 |
| 2005/0283791 A1 | 12/2005 | McCarthy et al. | |
| 2005/0288999 A1 | 12/2005 | Lerner et al. | |
| 2006/0011371 A1 | 1/2006 | Fahey | |
| 2006/0021057 A1* | 1/2006 | Risan et al. | 726/26 |
| 2006/0031381 A1 | 2/2006 | Van Luijt et al. | |
| 2006/0050970 A1 | 3/2006 | Gunatilake | |
| 2006/0051055 A1 | 3/2006 | Ohkawa | |
| 2006/0095401 A1 | 5/2006 | Krikorian et al. | |
| 2006/0095471 A1 | 5/2006 | Krikorian et al. | |
| 2006/0095472 A1 | 5/2006 | Krikorian et al. | |
| 2006/0095942 A1 | 5/2006 | Van Beek | |
| 2006/0095943 A1 | 5/2006 | Demircin et al. | |
| 2006/0107226 A1 | 5/2006 | Matthews et al. | |
| 2006/0117371 A1 | 6/2006 | Margulis | |
| 2006/0146174 A1 | 7/2006 | Hagino | |
| 2006/0161635 A1* | 7/2006 | Lamkin et al. | 709/217 |
| 2006/0280157 A1 | 12/2006 | Karaoguz et al. | |
| 2007/0003224 A1 | 1/2007 | Krikorian et al. | |
| 2007/0005783 A1 | 1/2007 | Saint-Hillaire et al. | |
| 2007/0022328 A1 | 1/2007 | Tarra et al. | |
| 2007/0074115 A1 | 3/2007 | Patten et al. | |
| 2007/0076604 A1 | 4/2007 | Litwack | |
| 2007/0168543 A1 | 7/2007 | Krikorian et al. | |
| 2007/0180485 A1 | 8/2007 | Dua | |
| 2007/0198532 A1 | 8/2007 | Krikorian et al. | |
| 2007/0234213 A1 | 10/2007 | Krikorian et al. | |
| 2007/0286596 A1 | 12/2007 | Lonn | |
| 2008/0005676 A1* | 1/2008 | Evans et al. | 715/740 |
| 2008/0019276 A1 | 1/2008 | Takatsuji et al. | |
| 2008/0037573 A1 | 2/2008 | Cohen | |
| 2008/0059533 A1 | 3/2008 | Krikorian | |
| 2008/0066185 A1* | 3/2008 | Lester et al. | 726/27 |
| 2008/0083035 A1* | 4/2008 | Dong et al. | 726/26 |
| 2008/0134267 A1* | 6/2008 | Moghe et al. | 725/112 |
| 2008/0155702 A1* | 6/2008 | Bala et al. | 726/27 |
| 2008/0195744 A1 | 8/2008 | Bowra et al. | |
| 2008/0199150 A1 | 8/2008 | Candelore | |
| 2008/0240444 A1 | 10/2008 | Shuster | |
| 2008/0267398 A1* | 10/2008 | Peterka et al. | 380/200 |
| 2008/0294759 A1 | 11/2008 | Biswas et al. | |
| 2008/0307456 A1 | 12/2008 | Beetcher et al. | |
| 2008/0307462 A1 | 12/2008 | Beetcher et al. | |
| 2008/0307463 A1 | 12/2008 | Beetcher et al. | |
| 2009/0070884 A1* | 3/2009 | Wu et al. | 726/27 |
| 2009/0074380 A1 | 3/2009 | Boston et al. | |
| 2009/0199248 A1 | 8/2009 | Ngo et al. | |
| 2010/0005483 A1* | 1/2010 | Rao | 725/25 |
| 2010/0064055 A1* | 3/2010 | Krikorian et al. | 709/231 |
| 2010/0064332 A1* | 3/2010 | Krikorian et al. | 725/110 |
| 2010/0100915 A1 | 4/2010 | Krikorian et al. | |
| 2010/0129057 A1* | 5/2010 | Kulkarni | 386/95 |
| 2010/0146527 A1* | 6/2010 | Craib et al. | 725/5 |

FOREIGN PATENT DOCUMENTS

| | | |
|---|---|---|
| EP | 0838945 A | 4/1998 |
| EP | 1077407 A1 | 2/2001 |
| EP | 1443766 A2 | 8/2004 |
| EP | 1691550 A | 8/2006 |
| EP | 1830558 A1 | 9/2007 |
| GB | 2307151 A | 5/1997 |
| KR | 19990082855 A | 11/1999 |
| KR | 20010211410 A | 8/2001 |
| WO | 0133839 A1 | 5/2001 |
| WO | 0147248 A2 | 6/2001 |
| WO | 0193161 A1 | 12/2001 |
| WO | 03026232 A1 | 3/2003 |
| WO | 0352552 A2 | 6/2003 |
| WO | 03098897 A | 11/2003 |
| WO | 2004032511 A1 | 4/2004 |
| WO | 2005050898 A2 | 6/2005 |
| WO | 2006064454 A1 | 6/2006 |
| WO | 2006074110 A | 7/2006 |
| WO | 2007027891 A2 | 3/2007 |
| WO | 2007051156 A2 | 5/2007 |
| WO | 2007141555 A2 | 12/2007 |
| WO | 2007149466 A2 | 12/2007 |
| WO | WO 2007141555 A2 * | 12/2007 |
| WO | 2008024723 A | 2/2008 |

OTHER PUBLICATIONS

MythTV Wiki, "MythTV User Manual" [Online], Aug. 27, 2007, XP002515046; retrieved from the Internet: <URL: http://www.mythtv.org/wiki?title=User_Manual:Introduction&oldid=25549>.

International Searching Authority, Written Opinion and International Search Report for International Application No. PCT/US2008/077733, mailed Mar. 18, 2009.

International Searching Authority, Written Opinion and International Search Report for International Application No. PCT/US2008/087005, mailed Mar. 20, 2009.

Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.

Yasuhiko Watanabe et al., "Aligning Articles in TV Newscasts and Newspapers"; Proceedings of the International Conference on Computational linguistics, XX, XX, Jan. 1, 1998, pp. 1381-1387, XP002402825.

Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.

Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.

USPTO, Non-Final Office Action mailed Dec. 17, 2004; U.S. Appl. No. 09/809,868, filed Mar. 15, 2001.

USPTO, Final Office Action mailed Jul. 28, 2005; U.S. Appl. No. 09/809,868, filed Mar. 15, 2001.

USPTO, Non-Final Office Action mailed Jan. 30, 2006; U.S. Appl. No. 09/809,868, filed Mar. 15, 2001.

USPTO, Final Office Action mailed Aug. 10, 2006; U.S. Appl. No. 09/809,868, filed Mar. 15, 2001.

USPTO, Non-Final Office Action mailed Jun. 19, 2007; U.S. Appl. No. 09/809,868, filed Mar. 15, 2001.

USPTO, Non-Final Office Action mailed Apr. 16, 2008; U.S. Appl. No. 09/809,868, filed Mar. 15, 2001.

USPTO, Final Office Action mailed Sep. 18, 2008; U.S. Appl. No. 09/809,868, filed Mar. 15, 2001.

USPTO, Non-Final Office Action mailed Mar. 31, 2009; U.S. Appl. No. 09/809,868, filed Mar. 15, 2001.

USPTO, Non-Final Office Action mailed May 1, 2008; U.S. Appl. No. 11/111,265, filed Apr. 21, 2005.

USPTO, Final Office Action mailed Dec. 29, 2008; U.S. Appl. No. 11/111,265, filed Apr. 21, 2005.

USPTO, Non-Final Office Action mailed Jun. 8, 2009; U.S. Appl. No. 11/111,265, filed Apr. 21, 2005.

USPTO, Non-Final Office Action mailed Jun. 26, 2008; U.S. Appl. No. 11/620,707, filed Jan. 7, 2007.

USPTO, Final Office Action mailed Oct. 21, 2008; U.S. Appl. No. 11/620,707, filed Jan. 7, 2007.

USPTO, Non-Final Office Action mailed Mar. 25, 2009; U.S. Appl. No. 11/620,707, filed Jan. 7, 2007.

USPTO, Non-Final Office Action mailed Aug. 7, 2008; U.S. Appl. No. 11/620,711, filed Jan. 7, 2007.

USPTO, Final Office Action mailed Feb. 9, 2009; U.S. Appl. No. 11/620,711, filed Jan. 7, 2007.

USPTO, Non-Final Office Action mailed Feb. 25, 2009; U.S. Appl. No. 11/683,862, filed Mar. 8, 2007.

USPTO, Non-Final Office Action mailed Dec. 24, 2008; U.S. Appl. No. 11/147,985, filed Jun. 7, 2005.

USPTO, Non-Final Office Action mailed Jun. 25, 2008; U.S. Appl. No. 11/428,254, filed Jun. 30, 2006.

USPTO, Final Office Action mailed Feb. 6, 2009; U.S. Appl. No. 11/428,254, filed Jun. 30, 2006.

USPTO, Non-Final Office Action mailed May 15, 2009; U.S. Appl. No. 11/147,664, filed Jun. 7, 2005.

Sonic Blue "ReplayTV 5000 User's Guide," 2002, entire document.

Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.

Microsoft Corporation; Harman/Kardon "Master Your Universe" 1999.

Matsushita Electric Corporation of America MicroCast: Wireless PC Multimedia Transceiver System, Nov. 1998.

"Wireless Local Area Networks: Issues in Technology and Standards" Jan. 6, 1999.

USPTO, Final Office Action mailed Jun. 25, 2009; U.S. Appl. No. 11/147,985, filed Jun. 7, 2005.

China State Intellectual Property Office "First Office Action," issued Jul. 31, 2009, for Application No. 200580026825.

USPTO, Non-Final Office Action, mailed Aug. 4, 2009; U.S. Appl. No. 11/734,277, filed Apr. 12, 2007.

USPTO, Final Office Action, mailed Jul. 31, 2009; U.S. Appl. No. 11/683,862, filed Mar. 8, 2007.

USPTO, Non-Final Office Action, mailed Aug. 5, 2009; U.S. Appl. No. 11/147,663, filed Jun. 7, 2005.

USPTO, Non-Final Office Action, mailed Sep. 3, 2009; U.S. Appl. No. 11/620,711, filed Jan. 7, 2007.

Einaudi, Andrew E. et al. "Systems and Methods for Selecting Media Content Obtained from Multiple Sources," U.S. Appl. No. 12/543,278, filed Aug. 18, 2009.

Malode, Deepak Ravi "Remote Control and Method for Automatically Adjusting the Volume Output of an Audio Device," U.S. Appl. No. 12/550,145, filed Aug. 28, 2009.

Akella, Aparna Sarma "Systems and Methods for Event Programming Via a Remote Media Player," U.S. Appl. No. 12/537,057, filed Aug. 6, 2009.

Shah, Bhupendra Natwerlan et al. "Systems and Methods for Transcoding and Place Shifting Media Content," U.S. Appl. No. 12/548,130, filed Aug. 26, 2009.

Banger, Shashidhar et al. "Systems and Methods for Automatically Controlling the Resolution of Streaming Video Content," U.S. Appl. No. 12/537,785, filed Aug. 7, 2009.

Panigrahi, Biswaranjan "Home Media Aggregator System and Method," U.S. Appl. No. 12/538,681, filed Aug. 10, 2009.

Nandury, Venkata Kishore "Adaptive Gain Control for Digital Audio Samples in a Media Stream," U.S. Appl. No. 12/507,971, filed Jul. 23, 2009.

Shirali, Amey "Systems and Methods for Providing Programming Content," U.S. Appl. No. 12/538,676, filed on Aug. 10, 2009.

Thiyagarajan, Venkatesan "Systems and Methods for Virtual Remote Control of Streamed Media," U.S. Appl. No. 12/538,664, filed Aug. 10, 2009.

Thiyagarajan, Venkatesan et al. "Localization Systems and Method," U.S. Appl. No. 12/538,783, filed Aug. 10, 2009.

Shirali, Amey et al. "Methods and Apparatus for Seeking Within a Media Stream Using Scene Detection," U.S. Appl. No. 12/538,784, filed Aug. 10, 2009.

Thiyagarajan, Venkatesan "Systems and Methods for Updating Firmware Over a Network," U.S. Appl. No. 12/538,661, filed Aug. 10, 2009.

Iyer, Satish "Methods and Apparatus for Fast Seeking Within a Media Stream Buffer," U.S. Appl. No. 12/538,659, filed Aug. 10, 2009.

European Patent Office, International Searching Authority, "International Search Report," for International Application No. PCT/US2009/049006, mailed Sep. 11, 2009.

Conway, Frank et al. "Systems and Methods for Creating Variable Length Clips from a Media Stream," U.S. Appl. No. 12/347,465, filed Dec. 31, 2008.

Lucas, Brian et al. "Systems and Methods for Establishing Connections Between Devices Communicating Over a Network," U.S. Appl. No. 12/426,103, filed Apr. 17, 2009.

USPTO, Final Office Action, mailed Nov. 6, 2009; U.S. Appl. No. 09/809,868, filed Mar. 15, 2001.

Thiyagarajan, Venkatesan et al. "Always-On-Top Media Player Launched From a Web Browser," U.S. Appl. No. 12/617,271, filed Nov. 12, 2009.

Newton's Telecom Dictionary, 21st ed., Mar. 2005.

European Patent Office, European Search Report, mailed Sep. 28, 2009 for European Application No. EP 06 78 6175.

Paul, John Michael et al. "Systems and Methods for Delivering Messages Over a Network," U.S. Appl. No. 12/619,192, filed Nov. 16, 2009.

USPTO, Final Office Action mailed Nov. 12, 2009; U.S. Appl. No. 11/620,707, filed Jan. 7, 2007.

USPTO, Non-Final Office Action mailed Nov. 23, 2009; U.S. Appl. No. 11/683,862, filed Mar. 8, 2007.

International Search Report for PCT/US2008/069914 mailed Dec. 19, 2008.

Ditze M. et al "Resource Adaptation for Audio-Visual Devices in the UPnP QoS Architecture," Advanced Networking and Applications, 2006; AINA, 2006; 20% H International conference on Vienna, Austria Apr. 18-20, 2006.

Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.

Lowekamp, B. et al. "A Hierarchy of Network Performance Characteristics for Grid Applications and Services," GGF Network Measurements Working Group, pp. 1-29, May 24, 2004.

USPTO, Non-Final Office Action mailed Oct. 1, 2009; U.S. Appl. No. 11/778,287, filed Jul. 16, 2007.

Rao, Padmanabha R. et al. "Methods and Apparatus for Establishing Network Connections Using an Inter-Mediating Device," U.S. Appl. No. 12/642,368, filed Dec. 18, 2009.

Dham, Vikram et al. "Systems and Methods for Establishing Network Connections Using Local Mediation Services," U.S. Appl. No. 12/644,918, filed Dec. 22, 2009.

Paul, John et al. "Systems and Methods for Remotely Controlling Media Server Via a Network," U.S. Appl. No. 12/645,870, filed Dec. 23, 2009.

USPTO Final Office Action mailed Dec. 30, 2009; U.S. Appl. No. 11/147,664, filed Jun. 7, 2005.

Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.

Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.

PCT Partial International Search, PCT/US2009/054893, mailed Dec. 23, 2009.

Bajpal, Parimal et al. "Method and Node for Transmitting Data Over a Communication Network using Negative Ackhowledgement," U.S. Appl. No. 12/404,920, filed Mar. 16, 2009.

Bajpal, Parimal et al. "Method and Note for Employing Network connections Over a Connectinoless Transport Layer Protocol," U.S. Appl. No. 12/405,062, filed Mar. 16, 2009.

Asnis, Ilya et al. "Mediated Network address Translation Traversal" U.S. Appl. No. 12/405,039, filed Mar. 16, 2009.

Srisuresh, P. et al. "Traditional IP Network Address Translator (Traditional NAT)," Network Working Group, The Internet Society, Jan. 2001.

Paul, John et al. "Systems and Methods for Searching Media Content," U.S. Patent Appl. No. 12/648,024, filed Dec. 28, 2009.

Australian Government "Office Action," Australian Patent Application No. 2006240518, mailed Nov. 12, 2009.

Krikorian, Jason, U.S. Appl. No. 11/734,277, filed Apr. 12, 2007.

Tarra, Raghuveer et al., U.S. Appl. No. 60/975,239, filed Sep. 26, 2007.

Williams, George Edward, U.S. Appl. No. 12/167,041, filed Jul. 2, 2008.

Rao, Padmanabha R., U.S. Appl. No. 12/166,039, filed Jul. 1, 2008.

International Search Report and Written Opinion, PCT/US2005/020105, Feb. 15, 2007, 6 pages.

International Search Report and Written Opinion for PCT/US2006/04382, mailed Apr. 27, 2007.

Archive of "TV Brick Home Server," www.tvbrick.com, [online] [Archived by archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.

Faucon, B. "TV 'Brick' Opens up Copyright Can of Worms," Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01&pagetype+printer§ion+1053801318705&path+articles/2003/06/30/0156825330084.html.].

Balster, Eric J., "Video Compression and Rate Control Methods Based on the Wavelet Transform," The Ohio State University 2004, pp. 1-24.

Kulapala et al., "Comparison of Traffic and Quality Characteristics of Rate-Controlled Wavelet and DCT Video," Arizona State University, Oct. 11, 2004.

Skodras et al., "JPEG2000: The Upcoming Still Image Compression Standard," May 11, 2000, 14 pages.

Taubman et al., "Embedded Block Coding in JPEG2000," Feb. 23, 2001, pp. 1-8 of 36.

Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.

Roe, Kevin, "Third-Party Observation Under EPC Article 115 on the Patentability of an Invention," Dec. 21, 2007.

Roe, Kevin, Third-Party Submission for Published Application Under CFR §1.99, Mar. 26, 2008.

Bajpai, Parimal et al. "Systems and Methods of Controlling the Encoding of a Media Stream," U.S. Appl. No. 12/339,878, filed Dec. 19, 2008.

Malone, Edward D. et al. "Systems and Methods for Controlling Media Devices," U.S. Appl. No. 12/256,344, filed Oct. 22, 2008.

Banger, Shashidhar et al. "Systems and Methods for Determining Attributes of Media Items Accessed Via a Personal Media Broadcaster," U.S. Appl. No. 12/334,959, filed Dec. 15, 2008.

Kulkarni, Anant Madhava "Systems and Methods for Creating Logical Media Streams for Media Storage and Playback," U.S. Appl. No. 12/323,907, filed Nov. 26, 2008.

Rao, Padmanabha R. "Systems and Methods for Linking Media Content," U.S. Appl. No. 12/359,784, filed Jan. 26, 2009.

Krikorian, Blake Gary et al. "Systems and Methods for Presenting Media Content Obtained From Multiple Sources," U.S. Appl. No. 12/408,456, filed Mar. 20, 2009.

Krikorian, Blake Gary et al. "Systems and Methods for Projecting Images From a Computer System," U.S. Appl. No. 12/408,460, filed Mar. 20, 2009.

International Search Report and Written Opinion for International Application No. PCT/US2006/025911, mailed Jan. 3, 2007.

International Search Report for International Application No. PCT/US2007/063599, mailed Dec. 12, 2007.

International Search Report for International Application No. PCT/US2007/076337, mailed Oct. 20, 2008.

International Search Report and Written Opinion for International Application No. PCT/US2006/025912, mailed Jul. 17, 2008.

International Search Report for International Application No. PCT/US2008/059613, mailed Jul. 21, 2008.

International Search Report and Written Opinion for International Application No. PCT/US2008/080910, mailed Feb. 16, 2009.

Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.

Wikipedia "LocationFree Player" [Online], Sep. 22, 2007, XP002512400; retrieved from the Internet: <URL: http://en.wikipedia.org/w/index.php?title=LocationFree_Player&oldid=159683564>; retrieved on Jan. 28, 2009.

Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control—Controlling-Your-Computer-With-a-Remote/?highlight=remote+control>; retrieved on Jan. 28, 2009.

Sling Media Inc. "Slingbox User Guide" [Online] 2006, XP002512553; retrieved from the Internet: <URL:http://www.slingmedia.hk/attach/en-US_Slingbox_User_Guide_v1.2pdf>; retrieved on Jan. 29, 2009.

Sony Corporation "LocationFree TV" [Online], 2004, SP002512410; retrieved from the Internet: <URL:http://www.docs.sony.com/release/LFX1_X5revision.pdf>; retrieved on Jan. 28, 2009 [note—document uploaded in two parts as file exceeds the 25MB size limit].

Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.

China State Intellectual Property Office "First Office Action," issued Jan. 8, 2010, for Application No. 200810126554.0.

USPTO Final Office action mailed Jan. 25, 2010; U.S. Appl. No. 11/734,277 filed Apr. 12, 2007.

Gurzhi, Alexander et al. "Systems and Methods for Emulation Network-Enabled Media Components," U.S App. No. 12/711,830, filed Feb. 24, 2010.

Jain, Vikal Kumar "Systems and Methods for Coordinating Data Communication Between Two Device," U.S. Appl. No. 12/699,280, filed Feb. 3, 2010.

"The Authoritative Dictionary of IEEE Standard Terms," 7th ed. 2000.

Newton's Telcom Dictionary, 20th ed., Mar. 2004.

USPTO Final Office Action mailed Mar. 3, 2010; U.S. Appl. No. 11/111,265, filed Apr. 21, 2005.

USPTO Final Office Action mailed Mar. 12, 2010; U.S. Appl. No. 11/620,711, filed Jan. 7, 2007.

European Patent Office, International Searching Authority, "International Search Report," mailed Mar. 30, 2010; International Application PCT/US2009/068468 filed Dec. 27, 2009.

USPTO Non-Final Office Action mailed Mar. 19, 2010; U.S. Appl. No. 11/147,664, filed Jun. 7, 2005.

USPTO Non-Final Office Action mailed Mar. 31, 2010; U.S. Appl. No. 11/620,707, filed Jan. 7, 2007.

USPTO Non-Final Office Action mailed Apr. 1, 2010; U.S Appl. No. 12/237,103, filed Sep. 24, 2008.

Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.

USPTO "Non-Final Office Action" mailed Apr. 7, 2011; U.S. Appl. No. 12/166,039, filed Jul. 1, 2008.

China State Intellectual Property Office "Office Action" issued Mar. 18, 2010 for Application No. 200680022520.6.

China State Intellectual Property Office "Office Action" issued Apr. 13, 2010 for Application No. 200580026825.

Canadian Intellectual Property Office "Office Action" mailed Feb. 18, 2010 for Application No. 2569610.

European Patent Office "European Search Report," mailed May 7, 2010 for Application No. 06786174.0.

Margulis, Neal "Apparatus and Method for Effectively Implementing a Wireless Television System," U.S. Appl. No. 12/758,193, filed Apr. 12, 2010.

Margulis, Neal "Apparatus and Method for Effectively Implementing a Wireless Television System," U.S. Appl. No. 12/758,194 filed Apr. 12, 2010.

Margulis, Neal "Apparatus and Method for Effectively Implementing a Wireless Television System," U.S. Appl. No. 12/758,196, filed Apr. 12, 2010.

Kirkorian, Jason Gary et al. "Personal Media Broadcasting System with Output Buffer," U.S. Appl. No. 12/757,697, filed Apr. 9, 2010.

Tarra, Raghuveer et al. "Firmware Update for Consumer Electronic Device," U.S. Appl. No. 12/757,714, filed Apr. 9, 2010.

Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.

European Patent Office, International Searching Authority, "International Search Report and Written Opinion," mailed Jun. 4, 2010 for International Application No. PCT/IN2009/000728, filed Dec. 18, 2009.

USPTO Non-Final Office Action mailed Jun. 23, 2010; U.S. Appl. No. 11/933,969, filed Nov. 1, 2007.

Korean Intellectual Property Office "Official Notice of Preliminary Rejection," issued Jun. 18, 2010; Korean Patent Application No. 10-2008-7021254.

Canadian Patent Office, Canadian Office Action for Canadian Patent Application No. 2,728,404, dated Aug. 17, 2011.

Unites States Patent Office, Office Action for U.S. Appl. No. 12/166,039, dated Sep. 8, 2011.

European Patent Office "International Search Report" mailed Nov. 8, 2010; International Appln. No. PCT/US2010/044674 filed Aug. 6, 2010.

RealVNC Limited "Getting Started With VNC"; Internet Article, Oct. 11, 2007, pp. 1-6, XP002605750; online, retrieved from the Internet: <URL:http://web.archive.org/web/20071011001300/http://www.realvnc.com/support/getting-started.html>; retrieved on Oct. 18, 2010.

US GOV "The Digital Millennium Copyright Act of 1998—US Copyright Office Summary" Dec. 1, 1998; [Online], pp. 1-18, XP007915379; retrieved from the Internet: <URL:http://www.copyright.gov/legislation/dmca.pdf ORD—1998-12-00>; retrieved on Oct. 18, 2010.

Christen Da Costa "Echostar T2200S Is the First SlingBox Loaded DVR Box ffor Cable"; Internet Article, Mar. 31, 2009, pp. 1-2, XP002605751; retrieved from the Internet: <URL:http://www.gadgetreview.com/2009/03/echostar-t2200s-is-the-first-slingbox-loaded-dvr-box-for-cable.html>; retrieved on Oct. 19, 2010.

Royal Philips Electronics "Philips Delivers New Audio/Video Decoders to Slingbox"; Internet Article, Nov. 1, 2005, pp. 1-2, XP002605752; retrieved from the Internet: <URL:http://www.tvover.netJ2005/11/01/
Philips+Delivers+New+AudioVideo+Decoders+To+Slingbox.
aspx>; retrieved on Oct. 18, 2010.

Tom Keating "Streaming Live TV", Online, Apr. 10, 2008, pp. 1-8, XP002605753; retrieved from the Internet: <URL:http://web.archive.org/web/20080410085730/http://blog.tmcnet.com/blog/tom-keating/voip/streaming-linve-tv.asp>; retrieved on Oct. 18, 2010.

* cited by examiner

SYSTEMS, METHODS, AND PROGRAM APPLICATIONS FOR SELECTIVELY RESTRICTING THE PLACESHIFTING OF COPY PROTECTED DIGITAL MEDIA CONTENT

PRIORITY CLAIM

This application claims priority to Foreign Application No. 1922/CHE/2009 entitled SYSTEMS, METHODS, AND PROGRAM APPLICATIONS FOR SELECTIVELY RESTRICTING THE PLACESHIFTING OF COPY PROTECTED DIGITAL MEDIA CONTENT and filed in India on Aug. 13, 2009, which is incorporated herein by reference in its entirety.

TECHNICAL FIELD

The present disclosure relates generally to systems, methods, and program applications for selectively restricting the placeshifting of copy protected digital media content.

BACKGROUND

In the past, consumers generally viewed television programming and other streaming media content as it was received from a network, broadcast, cable, or satellite source. As analog and digital recording devices (e.g., video cassette recorders, as well as digital/personal video recorders) became more prevalent, consumers were increasingly able to temporally shift their media viewing to more convenient viewing times. More recently, the ability to "placeshift" media viewing from one location to another has become more widespread. For example, SLING MEDIA of Foster City, Calif., currently markets placeshifting products under the trademark SLINGBOX that enable consumers to remotely view on a display device, such as a laptop computer, desktop computer, or mobile phone, television programming provided from a receiver residing in a different physical location than does the display device.

At present, digital media content is primarily placeshifted from a receiver or recorder over a digital network to a personal computer, wireless phone, or other portable device. However, consumers are becoming increasingly interested in non-traditional sources of digital media content typically viewed on a computer display, such as streaming video received via the Internet or other network. In addition, many consumers now possess video cameras or other equipment for generating their own content. Much of this content is in digital format that is most readily viewed on a personal computer or other digital computing device. A commercial demand has thus developed for the ability to placeshift video content from a personal computer to a remotely-located television or other display. However, a concern has arisen that, should consumers be provided with the capacity to placeshift video content from a personal computer to a remotely-located television or other remote display, the video content appearing on the remotely-located television could be recorded utilizing a video cassette recorder, a digital video recorder, or similar device connected to the television and thereby circumvent any copy protection measures associated with the video content originating from the personal computer.

Thus, there exists an ongoing commercial need to provide systems, methods, and program products that enable digital media content to be placeshifted from a computer system to a remotely-located television or other display, while also selectively restricting the placeshifting of copy protected digital media content to deter improper copying. These and other desirable features and characteristics will become apparent from the subsequent Detailed Description and the appended Claims, taken in conjunction with the accompanying Drawings and the foregoing Background.

BRIEF SUMMARY

Embodiments of a method executable by a computer system are provided. In one embodiment, a method includes the steps of capturing digital media content rendered on the local display by a media player application executed by the computer system; determining whether the media player application is accessing copy protected digital media content; and, if the media player application is not accessing copy protected digital media content, converting the captured digital media content to a media stream and transmitting the media stream over a network for presentation on a remote display.

Embodiments of a computer-readable medium are further provided that includes instructions stored thereon executable by a computer system to transmit digital media content over a network to a remote display. In one embodiment, the instructions includes a placeshifting program application adapted to perform steps of capturing digital media content rendered on a local display associated with the computer system by a media player application executed by the computer system, converting the captured digital media content to a media stream in a network-transmittable format, transmitting the media stream over the network for presentation on the remote display, determining whether the media player application is accessing a copy protected digital media file, and blocking transmission of the media stream if it is determined that the media player application is accessing a copy protected digital media file.

Embodiments of a computer system are further provided for placeshifting digital media content in conjunction with a digital network and a remote display. In one embodiment, the computer system includes a first interface to the digital network, a second interface to a local display, and a processor operatively coupled to the first interface and to the second interface. The processor is configured to selectively execute at least one media player application to render digital media content on the local display. The processor is further configured to: (i) capture at least a portion of the digital media content rendered on the local display, (ii) convert the captured digital media content to a media stream in a network-transmittable format, (iii) transmit the media stream over the network for presentation on the remote display, (iv) determine whether the media player application is accessing a copy protected digital media file, and (v) block transmission of the media stream if the media player application is accessing copy protected digital media content.

Various additional embodiments, aspects, and other features of the present invention are described in more detail below.

BRIEF DESCRIPTION OF THE DRAWING FIGURES

Exemplary embodiments will hereinafter be described in conjunction with the following Drawing Figures, wherein like numerals denote like elements, and:

Figure 3:
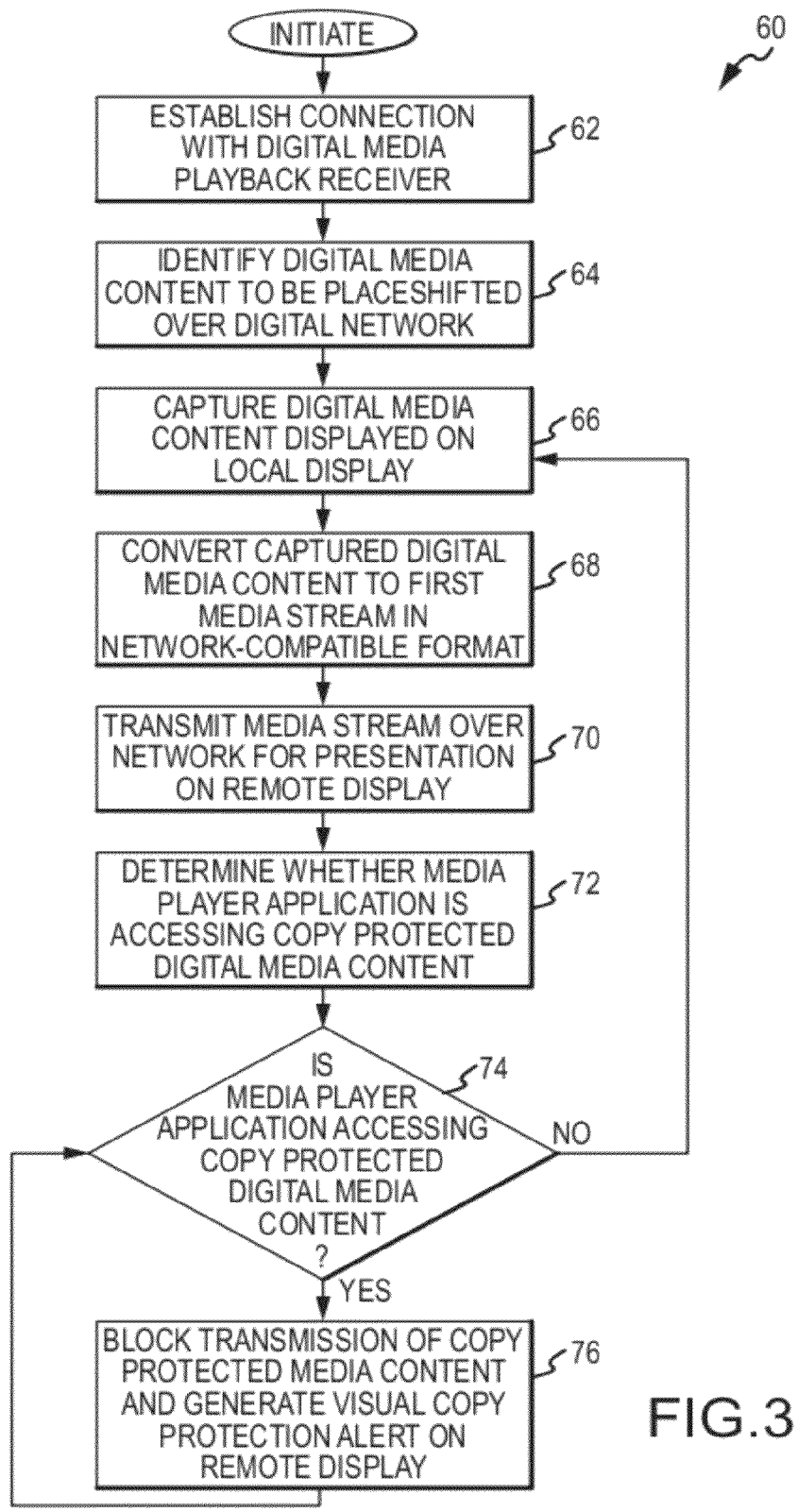
FIG. 3 is a flowchart illustrating an exemplary process that may be carried out by the computer system shown in FIGS. 1 and 2 to selectively restrict the transmission of copy protected digital media content over the digital network and to the remote display shown in FIG. 1.
Figure 5:
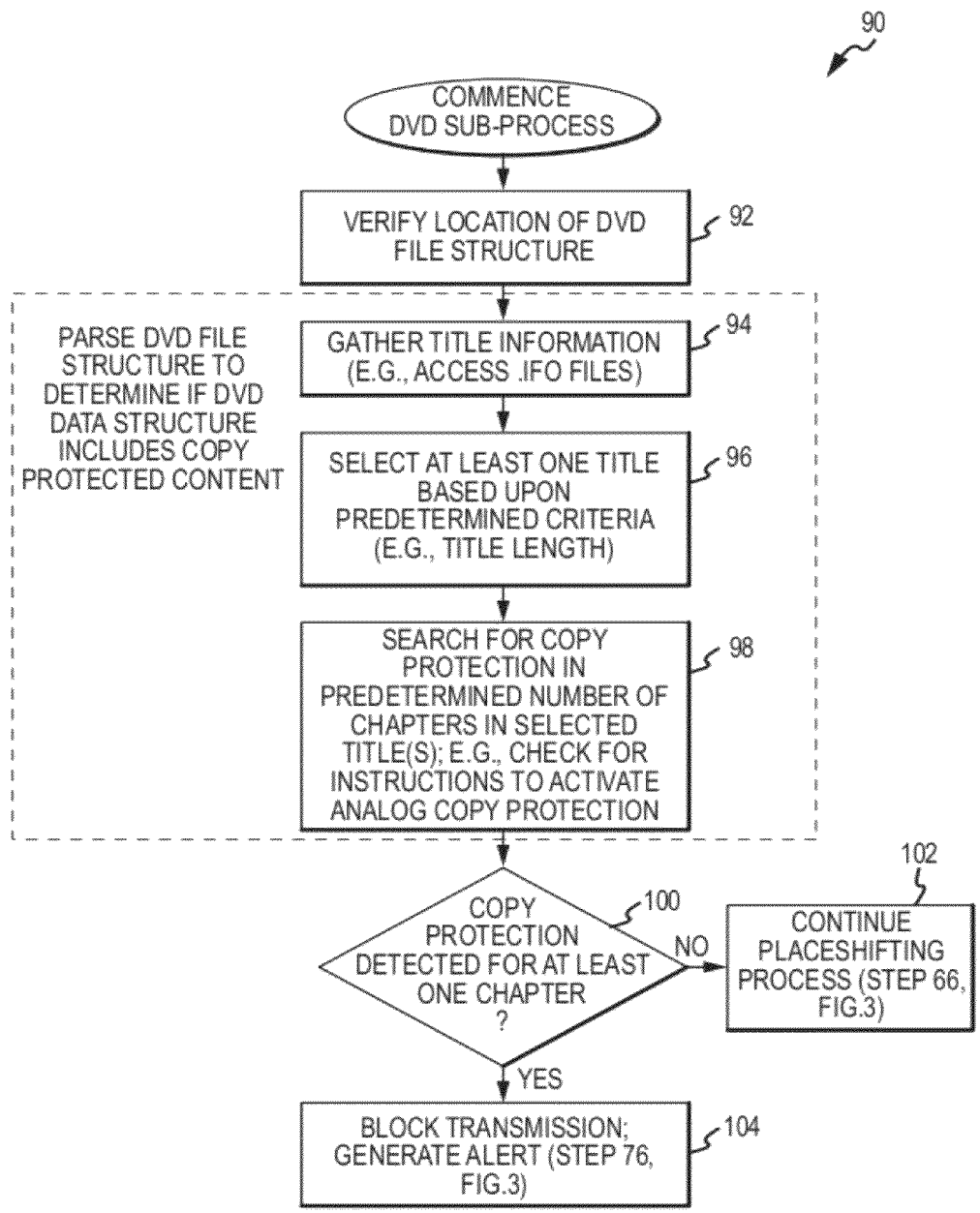
Figure 6:
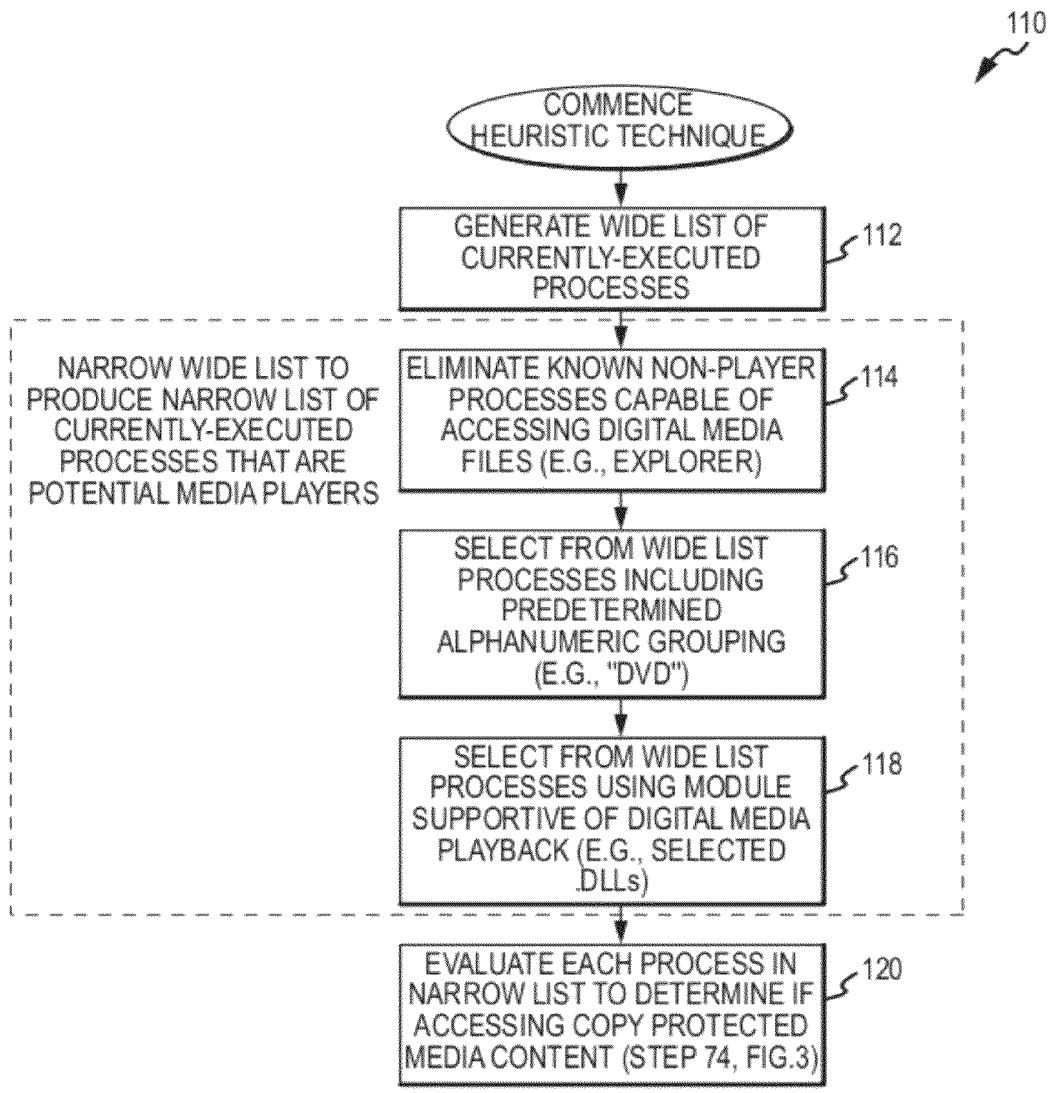

FIG. 5 is a flowchart illustrating a second exemplary sub-process that can be performed during the exemplary process illustrated in FIG. 3 to determine whether a media player application is accessing a digital versatile disc file structure including copy protected digital media content; and FIG. 6 is a flowchart illustrating an exemplary heuristic technique that can be performed during the exemplary process illustrated in FIG. 3 to yield a narrow list of currently-executed processes that can be evaluated with greater efficiency to determine whether a media player application is currently accessing copy protected media content.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
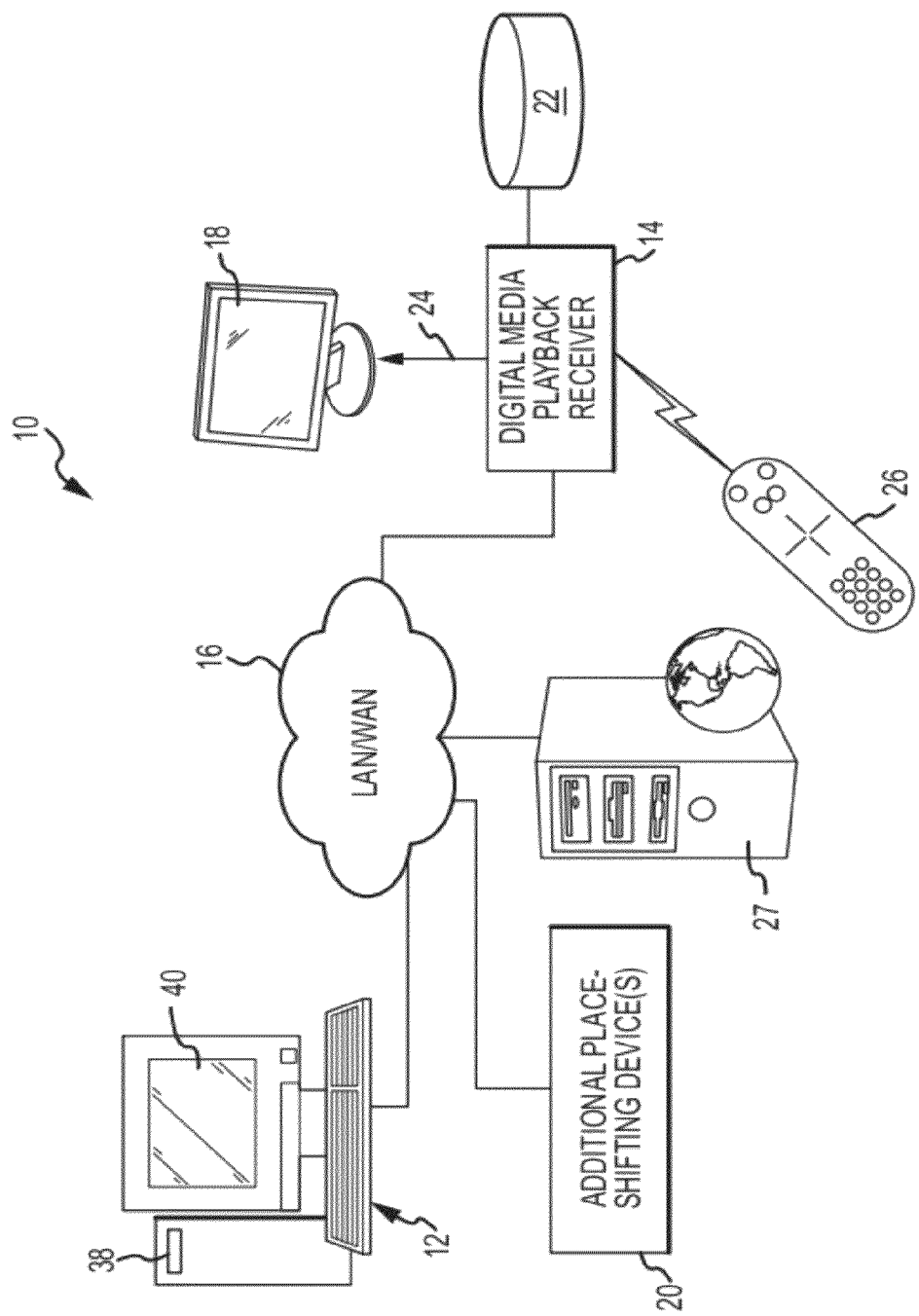
FIG. 1 is a block diagram of a generalized placeshifting system in accordance with an exemplary embodiment.

FIG. 1 illustrates a digital media (DM) placeshifting system 10 including a personal computer system 12 in accordance with an exemplary embodiment. In addition to computer system 12, DM placeshifting system 10 includes a digital media playback receiver 14 (also referred to as a "media catcher" in certain contexts) having a display 18 associated therewith. Display 18 is remotely located from computer system 12; e.g., display 18 and computer system 12 may reside in different rooms of a single structure, such as a user's home or office, or within separate buildings. For this reason, display 18 may be referred to as "remotely-located display 18" or, more simply, "remote display 18" herein. Display 18 and playback receiver 14 may be integrally combined as a unitary electronic device, such as a laptop computer, a mobile phone, a personal digital assistant, or the like. However, as indicated in FIG. 1, remote display 18 preferably assumes the form of a conventional television or other freestanding image generating device that is connected to playback receiver 14 utilizing one or more connector cables. During operation of DM placeshifting system 10, digital media playback receiver 14 provides video output signals 24 to remote display 18 to visually render media content received from computer system 12 on display 18 as described more fully below. Video output signals 24 provided from playback receiver 14 to remote display 18 may be formatted in accordance with conventionally-known standards, such as S-video, High-Definition Multimedia Interface (HDMI), Sony/Philips Display Interface Format (SPDIF), Digital Visual Interface (DVI), or IEEE 1394 standards.

A digital network 16 permits communication between computer system 12 and digital media playback receiver 14. More specifically, digital network 16 enables computer system 12 to transmit streaming media content to digital media playback receiver 14 for playback on remote display 18. Digital network 16 can comprise any communication network enabling the streaming of media content, and specifically the streaming of video content, from computer system 12 to playback receiver 14 in this manner. In instances wherein digital media playback receiver 14 is located relatively far away from computer system 12 (e.g., when playback receiver 14 and computer system 12 reside in separate buildings), network 16 conveniently includes one or more public or private data connections, links, or networks supporting any number of communications protocols. Network 16 can also include the Internet or any other network based upon TCP/IP or other conventional protocols. The foregoing notwithstanding, DM placeshifting system 10 will typically assume the form of a wide area network, a local area network, or a combination of wide and local area networks as indicated in FIG. 1. For example, in one common scenario wherein DM placeshifting system 10 is implemented within a relatively small geographical area (e.g., within a user's home, office, or other structure), network 16 may comprise one or more local area networks conforming to IEEE 802.3 and/or IEEE 802.11 standards. Network 16 as illustrated in FIG. 1, then, is intended to broadly encompass any digital communications network(s), systems, or architectures for transmitting data between the various components of system 10.

In the exemplary embodiment illustrated in FIG. 1, DM placeshifting system 10 further includes at least one server 27 communicatively coupled to computer system 12 and digital media playback receiver 14 through digital network 16. In certain embodiments, server 27 can be a conventional Internet server configured to interact with a browser or viewer application executing on digital media playback receiver 14 to provide images, audio, video, and/or other content. In further embodiments, server 27 can be a web server linked to other content servers made available to digital media playback receiver 14. In such embodiments, a user may direct digital media playback receiver 14 to initially contact server 27 and subsequently direct digital media playback receiver 14 to follow hypertext markup language (HTML) or other links provided by server 27. Many different interface options are available across a wide array of equivalent implementations to allow digital media playback receiver 14 to obtain media content from any number of servers 28.

Digital media playback receiver 14 is conveniently, although not necessarily, capable of receiving digital media from sources other than computer system 12 and possibly server 27. For example, as indicated in FIG. 1, digital media playback receiver 14 may also selectively receive digital media from at least one additional placeshifting device 20 included within DM placeshifting system 10 and communicatively coupled to playback receiver 14 via network 16. If provided, additional placeshifting device 20 will typically include transcoder logic for converting digital media content (e.g., video/audio data) into a packetized format (e.g., MPEG, QUICKTIME, WINDOWS MEDIA, and/or the like) suitable for transmission over network 16 in the commonly known manner. In addition to, or in lieu of, additional placeshifting device 20, DM placeshifting system 10 may further include an auxiliary volume storage device 22 locally connected to digital media playback receiver 14. Auxiliary volume storage device 22 can be combined with playback receiver 14 as a single, freestanding electronic device. Alternatively, auxiliary volume storage device 22 can comprise an external device that is connected to playback receiver 14 utilizing one or more connector cables. Auxiliary volume storage device 22 may be an optical hard disk drive, a magnetic hard disk drive, a flash memory drive, or similar memory device on which a user may store media files (e.g., video files, still imagery, audio files, etc.) for subsequent playback on display 18.

Digital media playback receiver 14 may comprise any device configured to render media content received from computer system 12 on remote display 18. Such devices may include, without limitation, any sort of portable or non-portable general computer system, personal digital assistant, mobile phone, video game system, dedicated media player, and the like. When assuming the form of a standalone device, playback receiver 14 will commonly include software or firmware capable of receiving and decoding media streams and providing corresponding video and/or audio output signals to remote display 18. In many embodiments, digital media playback receiver 14 may receive user input via a number of physical input devices (e.g., buttons, sliders, knobs, etc.) disposed on the housing of playback receiver 14. Similarly, playback receiver 14 may be responsive to user commands received via a remote control as generally illustrated in FIG. 1 at 26.

Figure 2:
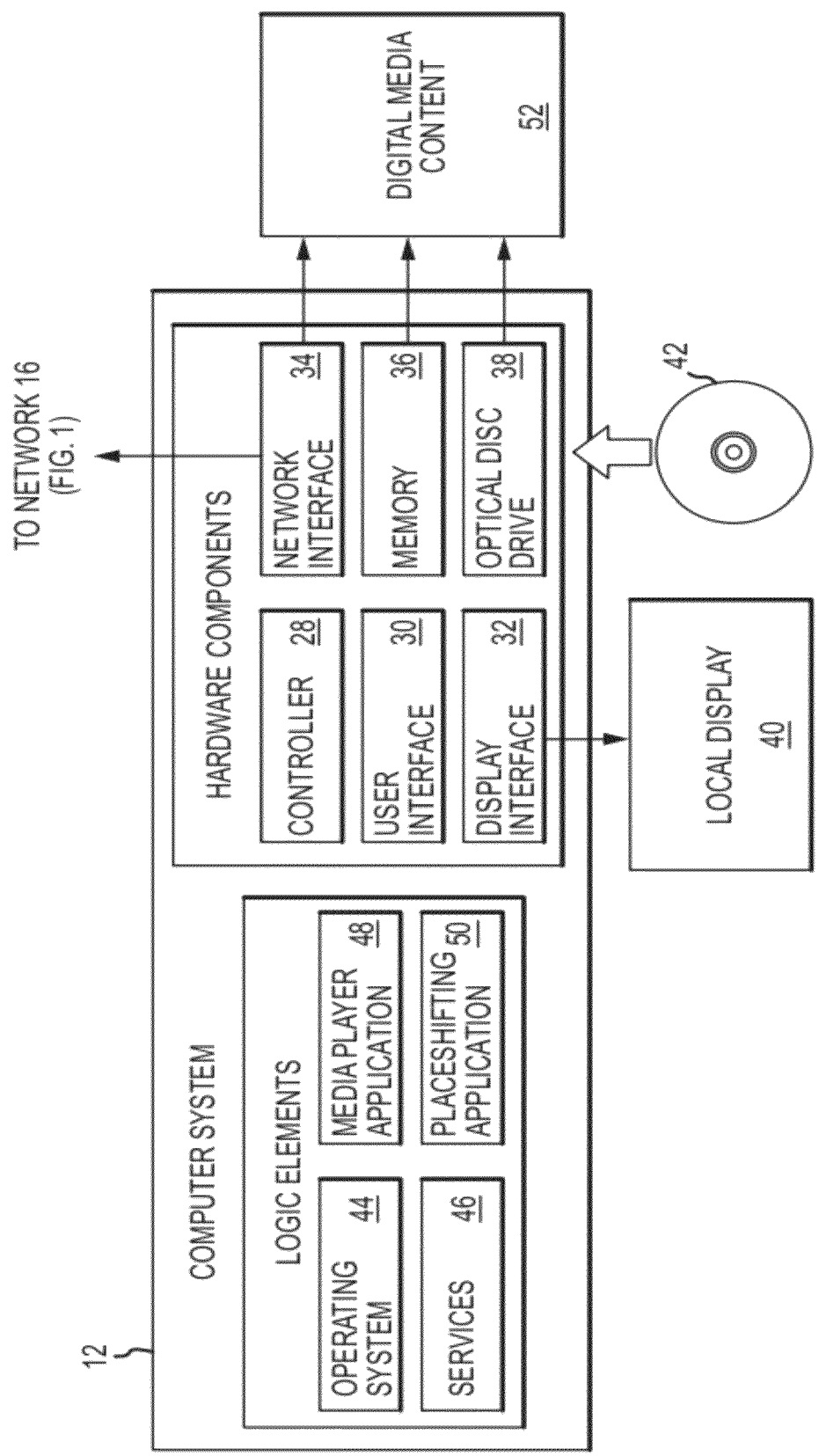
FIG. 2 is a block diagram of the exemplary computer system included within placeshifting system illustrated in FIG. 1.

FIG. 2 is a block diagram illustrating a number of hardware components and logical elements that may be included within computer system 12. As can be seen in FIG. 2, computer system 12 includes a controller 28, which is operatively coupled to user interface 30 and a display interface 32. User interface 30 is any device or devices suitable for receiving input data from a user in the manner described below. User interface 30 will commonly include a keypad (e.g., a QWERTY keyboard) and at least one cursor device, such as a mouse, trackball, touchpad, joystick, or pointing stick. Display interface 32 is any device, logical element, or combination thereof suitable for providing appropriately-formatted display signals from controller 28 to a locally-connected display (identified as "local display 40" in FIG. 2). In certain embodiments, local display 40 may be integrated within computer system 12 as, for example, the screen of a laptop computer. Alternatively, as indicated in FIG. 2, local display 40 may assume the form of a monitor or other freestanding image generating device connected to display interface 32 of computer system 12 utilizing a conventional connector cable.

Controller 28 is also operatively coupled to a network interface 34, which enables packetized data to be sent and received over a communications network (e.g., network 16 illustrated in FIG. 1). Digital network interface 34 may include transcoder logic for converting digital media content (e.g., video/audio data) into a packetized format (e.g., MPEG, QUICKTIME, WINDOWS MEDIA, and/or the like) suitable for transmission over digital network 16. Network interface 34 can operate utilizing any implementation of protocols or other features to support bi-directional communication over digital network 16. In various embodiments, network interface 34 supports conventional LAN, WAN, or other protocols (e.g., the TCP/IP or UDP/IP suite of protocols widely used on the Internet). In such cases, network interface 34 can interface with network 16 utilizing any sort of LAN adapter hardware, such as a conventional network interface card provided within computer system 12 (not shown).

Controller 28 is further operatively coupled to a number of memory elements (identified collectively as "memory 36" in FIG. 2). Memory 36 will typically include a central processing unit register, a number of temporary storage areas, and a number of permanent storage areas. Memory 36 can also include one or more mass storage devices, such as magnetic hard disk drives, optical hard disk drives, flash memory drives, and the like on which a user may store digital media content for subsequent playback on local display 40. In certain embodiments, memory 36 may include a freestanding mass storage device, such as an external hard-disc drive, coupled to computer system 12 utilizing a universal serial bus cable or other connector cable. As will be readily appreciated, selected programs (e.g., media player application 48 and/or placeshifting application 50 described below) can be copied to memory 56 as needed prior to execution by controller 28 to facilitate processing.

As shown in FIG. 2, controller 28 can further be operatively coupled to an optical disc drive 38. Optical disc drive 38 is any device capable of reading a conventionally-formatted high density optical disc, such as optical disc 38 shown in FIG. 2. In a preferred group of embodiments, optical disc drive 38 is compatible with optical discs formatted in accordance with digital versatile disc (DVD) standards and can access DVD file structures stored thereon. As indicated in FIG. 2, optical disc drive 38 can be internal to computer system 12. Alternatively, optical disc drive 38 can comprise a freestanding DVD player or other dedicated media player locally connected to computer system 12.

During operation, controller 28 generally directs the other hardware components of computer system 12 to perform the functions described herein below. In this regard, controller 28 can include any suitable number of individual microprocessors, microcontrollers, digital signal processors, programmed arrays, and other standard components known in the art. Controller 28 may include or cooperate with any number of software or firmware programs designed to carry out the various methods, process tasks, calculations, and control/display functions described herein. In many embodiments, controller 28 will execute an operating system 44 during operation of computer system 12 to assist the various programs executing on system 12 to access the hardware features of system 12. A non-exhaustive list of operating systems suitable for use as operating system 44 includes various versions of the WINDOWS operating systems available from the Microsoft Corporation of Redmond, Wash.; UNIX/LINUX operating systems available from a number of open source and proprietary sources; and the MACOS operating system available from the Apple Corporation of Cupertino, Calif. Any number of alternate embodiments based upon other operating systems and computing platforms could also readily be created and utilized as operating system 44.

Computer system 12 further includes a number of services 46, which provide features that assist in the execution of programs on computer system 12 during operation of operating system 44. Services 46 may be incorporated into operating system 44 and/or into specific drivers associated with the hardware components included within computer system 12 and described above. Services 46 may include abstraction services, such as the JAVA or ACTIVE-X products available from Sun Microsystems and the Microsoft Corporation, respectively. Other services may include graphics or other input/output related features, such as the DIRECTX/DIRECT3D or WINDOWS MEDIA PLAYER application programming interface available from the Microsoft Corporation, the Open Graphics Library (OpenGL) product available from numerous sources, the graphics device interface (GDI) product available as part of the Microsoft WINDOWS operating systems, and the Intel Integrated Performance Primitives (IPP) library, to list but a few.

Computer system 12 furthers include a placeshifting application 50 executable by controller 28. Placeshifting application 50 is any application that processes user inputs and/or media content in any manner to produce the media stream provided to digital media playback receiver 14 (FIG. 1). In various embodiments, placeshifting application 50 is a conventional software application or applet that resides in memory 36 on computer system 12 and that provides some or all of the various features described herein. In some implementations, at least a portion of application 48 is initially executed at system start-up and remains in system memory during operation of system 12 to facilitate rapid access to media content 52. Other embodiments may execute as a plugin or other enhancement to a conventional web browser program, or as any other sort of application, applet, object, module, and/or the like. As will be described more fully below, placeshifting application 50 is able to capture, encode, and transmit a video stream to digital media playback receiver 14 (FIG. 1) over network 16. As noted above, the video stream may be formatted in accordance with WINDOWS MEDIA, QUICKTIME, and/or MPEG standards, although any other standard or proprietary format could be equivalently used. In certain embodiments, placeshifting application 50 is configured to encode a portion of a screen display bitmap into a streaming format that can be transmitted on the media as described more fully below in conjunction with FIG. 3. To accomplish these various tasks, application 48 suitably interoperates with other applications and features of system 12 using operating system 44 and/or services 46.

Placeshifting application 50 may obtain the media content utilized to produce a media stream in any suitable manner. In various embodiments, placeshifting application 50 communicates with a media player application 48 that receives and renders audio, visual, and/or other media content. For example, as indicated in FIG. 2 at 52, media player application 48 can access video media content obtained from tangible media (e.g., DVD 42) read by optical disc drive 38, digital media files stored within memory 36, and/or media content delivered over digital network 16 and received via network interface 34. As will readily be appreciated, media player application 48 may be any conventional media player application any sort of plugin or other application associated with any sort of browser program, and/or the like. In one group of embodiments, media play application 48 is a version of the well-known WINDOWS MEDIA PLAYER program made commercially available from Microsoft Corporation.

FIG. 3 is a flowchart illustrating an exemplary placeshifting process 60 that may be carried out by computer system 12 (FIG. 2), and specifically by controller 28 during the execution of placeshifting application 50, to selectively transmit digital media content over digital network 16 (FIG. 1) and to remote display 18 (FIG. 1), as well as to selectively restrict the transmission of copy protected digital media content over network 16. To commence process 60 (FIG. 3), controller 28 first establishes a network connection with digital media playback receiver 14 utilizing network interface 34. Media player application 48 can identify digital media playback receiver 14 through an intermediating network host and information from digital media playback receiver 14 regarding an encoding frame rate and/or other parameters can subsequently be obtained. In many embodiments, the initially-received frame rate will remain relatively constant throughout the duration of the media stream, even though encoding bit rate and/or other parameters may vary. The connection established between computer system 12 and digital media playback receiver 14 can be established in any manner and in accordance with any format; e.g., conventional TCP/IP or UDP/IP constructs can be employed to establish a stream according to WINDOWS MEDIA, QUICKTIME, or MPEG formats After establishing a connection between computer system 12 and digital media playback receiver 14 (STEP 62, FIG. 3), controller 28 next identifies the media content to be placeshifted (STEP 64, FIG. 3). In a preferred group of embodiments, controller 28 identifies the media content to be placeshifted based upon user input received via user interface 30 of computer system 12. As a specific example, controller 28 may receive user input data via user interface 30 indicating that content displayed in a particular window is to be placeshifted. Alternatively, controller 28 may receive user input designating a portion of a window (e.g., a media screen contained within a web browser) to be placeshifted: e.g., in certain embodiments, computer system 12 may enable a user to draw a rectangular or other window on graphical user interface displayed on system 12 to allow the contents of that window to be placeshifted. Drawing the window or otherwise delineating a portion of the display allows the corresponding portion of video memory to be readily identified so that bitmap or other information about the contents of the window can be obtained. In further embodiments, the media content to be placeshifted may be automatically identified by controller 28; e.g., if a user is viewing a known webpage, controller 28 may be configured to placeshift a portion of that page associated with media imagery without placeshifting the remainder of the window or the display.

Controller 28 of computer system 12 next captures the identified digital media content to be placeshifted (STEP 66, FIG. 3). The identified media content can be captured from video memory (e.g., VRAM) at a frequency sufficient to establish a desired frame rate (e.g., 30 frames/second or so in one embodiment, although other embodiments may utilize any other sampling rate). In various embodiments, the frequency at which data is obtained is determined based upon the capacity or capabilities of playback receiver 14 as determined during STEP 62. As noted above, the size and location of the captured region of the video display may be manually or automatically configured in any manner. Moreover, the size or location of the captured region may change during the streaming session in response to changes in parameters relating to media content 52, to remote display 18, to network 16, or in the digital media playback receiver 14. Black (or other) padding data may be provided, if needed, to fill in the imagery transmitted and displayed.

Next, during STEP 68 (FIG. 3), the captured digital media content is encoded or otherwise converted into a media stream. In various embodiments, raw video frames captured from video memory are converted from a conventional bitmap or similar format to a compressed streaming video format suitable for transmission and/or routing on digital network 16. Such formats can include, but are not limited to, WINDOWS MEDIA PLAYER format, QUICKTIME format, MPEG format, and the like. For example, a media encoder module associated with placeshifting application 50 can perform encoding/transcoding on the captured frames to create the media stream in the desired format. Compression, encryption, and/or other processing can also be applied. If desired, audio data may be captured in addition to video content during STEP 68 (FIG. 3). Audio data can be captured by, for example, creating an audio device driver as part of placeshifting application 50 (FIGS. 1 and 2). Video, audio, and/or any other streams (e.g., control streams) can then be combined in any manner and transmitted on digital network 16 as desired (STEP 70). In various embodiments, the media stream is packetized into a suitable format and transmitted to media catcher over digital network 16 in conventional TCP/IP and/or UDP/IP packets, although alternative embodiments may utilize other networking schemes and structures.

Continuing with exemplary placeshifting process 60 illustrated in FIG. 3, controller 28 next determines whether media player application 48 is accessing one or more predetermined types of copy protected media content (STEP 72, FIG. 3). More specifically, during STEP 72 (FIG. 3), controller 28 may determine whether media player application 48 is accessing a digital media file supported by media player application 48 and containing digital rights management (DRM) protected content. Additionally or alternatively, controller 28 may determine whether media player application 48 is accessing a DVD file structure including copy protected video content. Controller 28 may determine whether the digital content accessed by media player application 48 includes either of these two types of copy protected media in any number of different manners. However, by way of non-limiting illustration, a first exemplary sub-process that can be performed during STEP 72 of placeshifting process 60 (FIG. 3) to determine whether media player application is accessing a digital media file supported by media player application 48 and containing DRM-protected content is described below in conjunction with FIG. 4; and a second exemplary sub-process that can be performed during STEP 72 of placeshifting process 60 (FIG. 3) to determine whether media player application is accessing a digital media file supported by media player application 48 and containing DRM-protected content is described below in conjunction with FIG. 5.

If determining that media player application 48 is not accessing copy protected digital media content during STEP 74 (FIG. 3), controller 28 returns to STEP 66 (FIG. 3) and the above-described placeshifting process is repeated. In this manner, controller 27 continually provides uninterrupted streaming media to digital media playback receiver 14 for playback on remote display 18 if copy protected digital media content is not being accessed. However, if media player application 48 is accessing a copy protected digital media content (STEP 74, FIG. 3), controller 28 advances to STEP 76 (FIG. 3) and blocks transmission of the media stream and, therefore, transmission of the copy protected media content. For example, controller 28 can halt the transmission of the media stream during STEP 76. Alternatively, controller 28 can obscure transmission of the media stream such that video content is still presented remote display 18, but the rendered video is sufficiently blurred or otherwise modified from conventional viewing standards to deter copying. In still further embodiments wherein controller 28 determines whether media player application 48 is accessing copy protected digital media content prior to commencing streaming of the digital media content (e.g., in embodiments wherein STEP 74 is performed before STEP 70 and possibly before STEPS 66 and 68), controller 28 can prevent the transmission of the media stream if it is determined that media player application 48 is accessing copy protected digital media content during STEP 74. Thus, as utilized herein, the term "blocking" is defined broadly to include halting or obscuring the transmission of a media steam if streaming has commenced, as well as preventing the transmission of a media stream if streaming has not yet commenced.

In addition to blocking transmission of the media stream, controller 28 may cause a visual copy protection alert to be visually expressed on remote display 18 during STEP 76 (FIG. 3). The visual copy protection alert generated by controller 28 and rendered on remote display 19 preferably explains that video streaming has been blocked due to the detection of copy protected media currently accessed by media player application 48. In one embodiment, controller 28 transmits a signal to digital media playback receiver 14 to generate on remote display 19 a predetermined visual alert stored in memory. In a second embodiment, the content of the visual alert is produced at computer system 12 and then transmitted to digital media playback receiver 14 for presentation on remote display 19. As a specific example, during STEP 76, controller 28 transmit over digital network 16 a bitmap or other image of a text message indicating that video streaming has been blocked due to the detection of currently-accessed copy protected media. The text message transmitted over network 16 during STEP 76 can include a message similar to the following: "PLAYBACK OF COPY PROTECTED CONTENT HAS BEEN PREVENTED. IF DVD IN DRIVE, PLEASE REMOVE." If desired, a similar visual copy protection alert can also be generated on local display 40 during STEP 76. STEPS 74 and 76 of process 60 are then repeated in a continual loop until it is determined that media player application 48 is no longer accessing copy protected digital media content (e.g., due to the removal of DVD 42 from optical disc drive 38), in which case controller 28 returns to STEP 66 and the placeshifting process is resumed.

Figure 4:
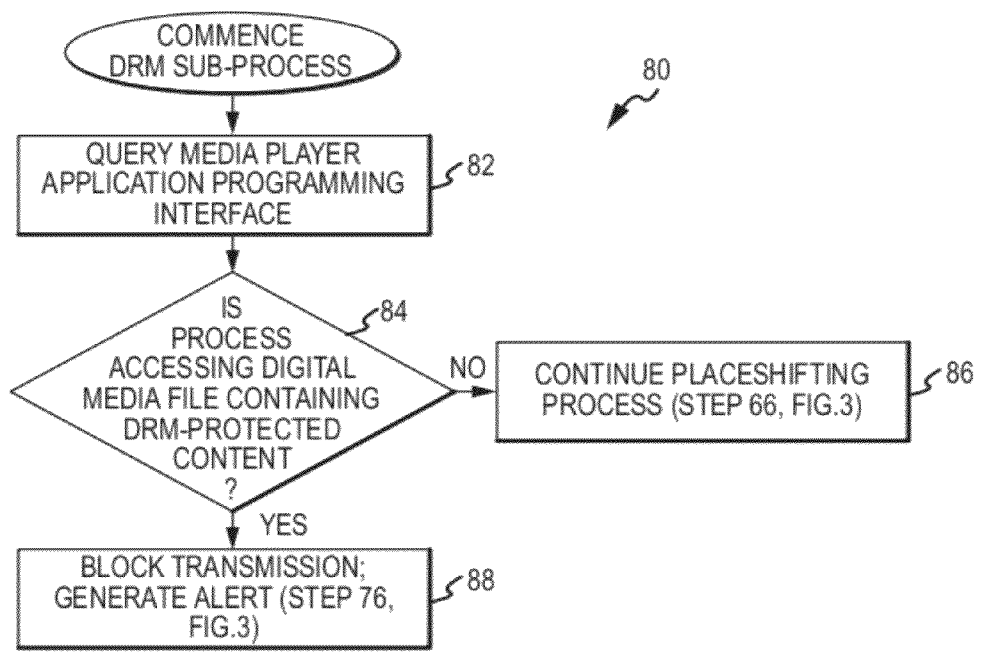
FIG. 4 is a flowchart illustrating a first exemplary sub-process that can be performed during the exemplary process illustrated in FIG. 3 to determine whether a media player application is accessing a digital media file containing DRM-protected content.

FIG. 4 is a flowchart illustrating a first exemplary sub-process 80 that can be performed during STEP 74 of process 60 (FIG. 3) to determine whether media player application 48 is accessing a digital media file containing DRM-protected content. In this example, services 46 of computer system 12 include an application programming interface (API) associated with media player application 48 (e.g., a source code interface provided by operating system 44 to support for services requested by computer programs executed on computer system 12). During initial STEP 82 of sub-process 80 (FIG. 4), controller 28 queries the API associated with media player application 48 to determine whether a particular digital media file contains DRM-protected content. In one specific implementation wherein media player application 48 is a WINDOWS MEDIA PLAYER application, controller 28 submits the appropriate query (e.g., the "WMIsContentProtected" function) to the MEDIA PLAYER API to determine whether digital media file contains DRM-protected content. Controller 28 then receives a response from the media player API and proceeds accordingly (STEP 84, FIG. 4). That is, if the media player API indicates that the digital media file contains DRM-protected content, controller 28 advances to STEP 76 of process 60 (FIG. 3), transmission of the media stream is blocked, and a copy protected media alert is generated as described above and indicated in FIG. 4 at 86. Alternatively, if the media player API indicates that the digital media does not contain DRM-protected content, controller 28 advances to STEP 66 of process 60 (FIG. 3) and the placeshifting process continues (indicated in FIG. 4 at 88).

FIG. 5 is a flowchart illustrating a second exemplary sub-process 90 that can be performed during STEP 74 of process 60 (FIG. 3) to determine whether media player application 48 is accessing a DVD file structure including copy protected digital media content. Sub-process 90 may be performed in conjunction with, or in lieu of, sub-process 80 (FIG. 4). After initialization of sub-process 90, controller 28 first verifies the location of a DVD file structure currently accessed by media player application 48 (STEP 92, FIG. 5). Although the DVD file structure will typically stored on an optical disc (e.g., DVD 42) read by optical disc drive 38, the DVD file structure can also be obtained from other sources; e.g., the DVD file structure can be stored within memory 36. Next, as indicated in FIG. 5, controller 28 searches at least a portion of the DVD file structure to determine if the DVD file structure includes copy protected media content. Controller 28 can search the DVD file structure for any previously-established type of copy protection mechanism; however, in a preferred group of embodiments, controller 28 searches at least a portion of the DVD file structure for instructions to activate analog copy protection. For example, during STEP 92, controller 28 may search sectors of the DVD file structure for data indicating that the analog copy protection mechanism marketed by the Rovi Corporation and commonly referred to as "MACROVISION" copy protection should be activated. In accordance with certain MACROVISION copy protection schemes, instructions whether to activate analog copy protection are related by two bits within a particular sector of the DVD file structure (e.g., the video object or .VOB files) corresponding to the particular titles of the DVD containing copy protected media content.

In certain embodiments, controller 28 may simply search each video object file contained within the DVD file structure to determine whether or not the DVD file structures includes copy protected media content, such as MACROVISION protected video content. However, even if computer system 12 has relatively robust processing capabilities, such a global search of the DVD file structure can place excessive processing and memory demands on computer system 12. More importantly, such a global search will typically require an excessively long time period to be fully carried out and consequently may permit an initial portion of copy protected content to be copied before transmission of the media stream can be blocked. It is therefore desirable for controller 28 to search only a subset of the titles and chapters contained within the DVD file structure to determine whether the DVD file structure contains copy protected media content. It should be noted, however, that a DVD file structure may include titles that include copy protected content (e.g., portions of the feature film), as well as titles that do not include copy protected content (e.g., previews and trailers). Thus, it is typically insufficient for controller 28 to determine whether the DVD file structure contains copy protected media content simply by checking the first title, the middle title, or any other predetermined title number included within the DVD file structure.

To streamline the search of the DVD file structure and overcome the above-noted limitations, during STEPS 94, 96, and 98 of sub-process 90, controller 28 identifies one or more titles included within the DVD file structure that correspond to the feature film and, thus, are likely to include any instructions to activate analog copy protection. Referring initially to STEP 94 (FIG. 5), controller 28 first accesses information files typically having an .ifo extension. Controller 28 then selects one or more titles to be searched for copy protection based upon title duration (STEP 96, FIG. 5); e.g., controller 28 can select the title having the longest duration, which typically includes the feature film or a significant portion thereof. Next, controller 28 searches a predetermined number of chapters (e.g., the first ten chapters) within the longest title to determine whether or not the DVD file structure includes copy protected media (STEP 98, FIG. 5). That is, during STEP 98 (FIG. 5), controller 28 can search one or more predetermined sectors of each chapter for instructions to activate an analog copy protection mechanism, such as MACROVISION copy protection.

If, during STEP 98 (FIG. 5), controller 28 determines that instruction to activate analog copy protection are detected for at least one chapter in the selected title or titles (STEP 100, FIG. 5), controller 28 advances to STEP 76 of process 60 (FIG. 3), blocks transmission of the media stream, and generates a copy protected media alert as previously described (indicated in FIG. 4 at 104). However, if no indication of instruction to activate copy protection are detected during STEP 98 (FIG. 5), controller 28 returns to STEP 66 of process 60 (FIG. 3) and the above-described placeshifting process continues without interruption (indicated in FIG. 4 at 102).

Exemplary sub-process 80 (FIG. 4) and exemplary sub-process 90 (FIG. 5) can be performed for each program currently executed on computer system 12; however, it is preferred that sub-processes 80 and 90 are performed to analyze only a selected subset of the currently-executed programs to improve operational speed and decrease system demands. Thus, one or more heuristic techniques can be performed prior to the execution of sub-process 80 and/or sub-process 90 to exclude certain currently-executed programs from subsequent evaluation. Further emphasizing this point, FIG. 6 is a flowchart illustrating an exemplary heuristic technique 110 that can be performed during the exemplary process illustrated in FIG. 3 to generate a narrow list of currently-executed processes that are potential media player applications currently-accessing copy protected digital media content. To commence heuristic technique 110, a wide list of processes currently executed on computer system 12 is compiled (STEP 112, FIG. 6) by, for example, taking a snapshot of all processes currently being executed by system 12. Next, steps are performed to narrow the wide list and thus yield a narrow list of currently-executed processes that are potential media players. In the illustrated example, any known non-player processes capable of accessing digital media files are eliminated from the wide list (STEP 114, FIG. 6). That is, controller 28 can recall from memory 36 a predetermined list of non-player processes that can access digital media files, such as certain browser applications (e.g., WINDOWS EXPLORER). After eliminating from the wide list any known non-player processes capable of accessing digital media files (STEP 114, FIG. 6), controller 28 next determines which processes to select from the wide list based at least in part upon which processes file names include a predetermined alphanumeric grouping. For example, as indicated in FIG. 6 at STEP 116, controller 28 can select from the wide list all processes that include the letter grouping "DVD." Lastly, controller 28 determines which processes to select from the wide list based at least in part upon which (if any) processes are currently utilizing a module supportive of digital media playback. More specifically, as indicated in FIG. 6 at STEP 118, controller 28 can select all processes currently utilizing a module, such as a link library, supportive of digital media playback. As a specific example, in embodiments wherein media player application 48 is a version of WINDOWS MEDIA PLAYER, controller 28 can select all processes currently utilizing one of the following digital link libraries: Wmvcore.dll (utilized to code and render content), Quartz.dll (a library with functionality for DIRECTSHOW included within DIRECTX), and Ddraw.dll (utilized in conjunction with DIRECT X to enable multimedia applications to draw 2D graphics). After generating the narrow list (STEPS 114, 116, and 118 shown in FIG. 6), controller 28 can advance to STEP 74 of process 60 (FIG. 3) and evaluate each process in the narrow list to determine whether copy protected digital media content is being accessed as described above (indicated in FIG. 6 at 120).

The foregoing has thus provided multiple exemplary embodiments of systems, methods, and program products that enable digital media content to be placeshifted from a computer system to a remotely-located television or other display, while selectively restricting the placeshifting of copy protected digital media content to deter improper copying. Although described above in conjunction with two particular types of copy protected digital media content (i.e., digital media files containing DRM-protected content and DVD file structures containing instructions to activate an analog protection mechanism, such a MACROVISION protection), it is emphasized that embodiments of the systems, methods, and program products described herein can be utilized to restrict the placeshifting, and thus deter the improper copy of, various other types of copy protected digital media content.

As utilized herein, the word "exemplary" means "serving as an example, instance, or illustration." Any implementation described herein as exemplary is not necessarily to be construed as preferred or advantageous over other implementations. While the foregoing Detailed Description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method executable by a computer system coupled to a local display, the method comprising:
   capturing video media content rendered on the local display by a media player application executed by the computer system and obtained from a digital versatile disc (DVD), the video media content captured from video memory while rendered on the local display by the media player application;
   determining whether the media player application is accessing copy protected video content stored on the DVD, determining comprising:
      parsing the DVD file structure to find information regarding titles contained within the DVD file structure;
      selecting at least one title based, at least in part, upon title duration; and
      searching the selected title to determine if the selected title contains instructions to activate analog copy protection;
   if it is determined that the selected title does not contain instructions to activate analog copy protection, converting the captured digital video content to a media stream and transmitting the media stream over a network for presentation on a remote display; and
   if it is determined that the selected title contains instructions to activate analog copy protection, blocking transmission of the media stream and causing a visual copy protection alert to be displayed on the remote display.

2. A method according to claim 1 wherein causing a visual copy protection alert to be displayed on the remote display comprises transmitting an image of a text message over the network for presentation on the remote display.

3. A method according to claim 1 further comprising:
   compiling a wide list of processes currently executed by the computer system; and
   narrowing the wide list to yield a narrow list of processes currently executed by the computer system and potentially comprising media player applications.

4. A method according to claim 3 wherein the determining comprises determining whether each process in the narrow list comprises a media player application accessing copy protected digital media content.

5. A method according to claim 4 wherein the narrowing comprises eliminating from the wide list any known non-player process capable of accessing digital media files.

6. A method according to claim 4 wherein the narrowing comprises determining which processes to select from the wide list based at least in part upon which, if any, process file names include a predetermined alphanumeric grouping.

7. A method according to claim 6 wherein the narrowing comprises determining which processes to select from the wide list based at least in part upon which, if any, process file names include the letter grouping "DVD".

8. A method according to claim 4 wherein the narrowing comprises determining which processes to select from the wide list based at least in part upon which, if any, processes are currently utilizing a module supportive of digital media playback.

9. A method according to claim 8 wherein the narrowing comprises determining which processes to select from the wide list based at least in part upon which, if any, processes are currently utilizing at least one type of shared library.

10. A method according to claim 1 wherein the determining further comprises:
   establishing if the media player application is accessing a predetermined file type supported by the media player application and containing digital rights management (DRM) protected content; and
   blocking transmission of the media stream if the media player application is accessing a predetermined file type supported by the media player application and containing DRM-protected content.

11. A method according to claim 10 wherein the media player application has an application programming interface associated therewith, and wherein the establishing comprises querying the application programming interface to determine if the media player application is accessing a digital media file containing DRM-protected content.

12. A non-transitory computer-readable medium comprising instructions stored thereon that are executable by a computer system to transmit digital media content over a network to a remote display, wherein the instructions comprise a placeshifting program application adapted to perform steps comprising:
   capturing digital media content rendered on a local display associated with the computer system by a media player application executed by the computer system, the digital media content obtained from a digital versatile disc (DVD) and captured while rendered on the local display;
   converting the captured digital media content to a media stream in a network-transmittable format;
   transmitting the media stream over the network for presentation on the remote display;
   determining whether the media player application is accessing a copy protected digital media file stored on the DVD, determining comprising:
      parsing the DVD to find information regarding titles contained within the DVD;
      selecting at least one title based, at least in part, upon title duration; and
      searching the selected title to determine if the selected title contains instructions to activate analog copy protection; and
   blocking transmission of the media stream if the selected title contains instructions to activate copy protection.

13. A non-transitory computer-readable medium according to claim 12 wherein the placeshifting program application is further adapted to block transmission of the media stream if the digital media content currently accessed by media player application comprises a digital media file supported by the media player application and containing digital media rights protected content.

14. A computer system for placeshifting digital media content in conjunction with a digital network and a remote display, the computer system comprising:
   a first interface to the digital network;
   a second interface to a local display; and
   a processor operatively coupled to the first interface and to the second interface, the processor configured to selectively execute at least one media player application to render digital media content on the local display and obtained from a digital versatile disc (DVD), the processor further configured to: (i) capture at least a portion of the digital media content while rendered on the local display, (ii) convert the captured digital media content to a media stream in a network-transmittable format, (iii) transmit the media stream over the network for presentation on the remote display, (iv) determine whether the media player application is accessing a copy protected digital media file stored on the DVD, and (v) block transmission of the media stream if the media player application is accessing copy protected digital media content wherein the processor is configured to determine whether the media player application is accessing a copy protected digital media file stored on the DVD by parsing the DVD to find information regarding titles contained within the DVD; by selecting at least one title based, at least in part, upon title duration; and by searching the selected title to determine if the selected title contains instructions to activate analog copy protection.

15. A computer system according to claim 14 wherein the processor is configured to block transmission of the media stream if the digital media content currently accessed by media player application comprises a digital media file supported by the media player application and containing digital media rights protected content.

* * * * *